No. 871,736. PATENTED NOV. 19, 1907.
J. F. RAYMOND.
FEED CHOPPER.
APPLICATION FILED NOV. 7, 1906.
Fig. 1.
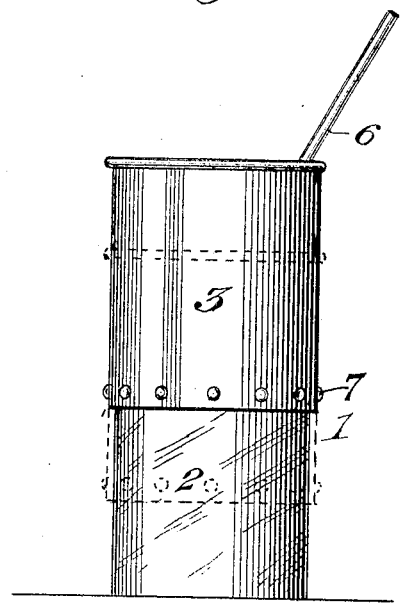
Fig. 2.
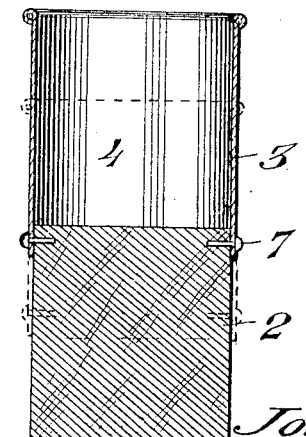
Fig. 3.
Witnesses
Phil. E. Barnes
D. W. Gould
Inventor
John F. Raymond.
By Victor J. Evans
Attorney
THE NORRIS PETERS CO., WASHINGTON, D. C.

UNITED STATES PATENT OFFICE.

JOHN F. RAYMOND, OF SCOTTSBLUFF, NEBRASKA.

FEED-CHOPPER.

No. 871,736.     Specification of Letters Patent.     Patented Nov. 19, 1907.

Application filed November 7, 1906. Serial No. 342,412.

*To all whom it may concern:*

Be it known that I, JOHN F. RAYMOND, a citizen of the United States, residing at Scottsbluff, in the county of Scottsbluff and State of Nebraska, have invented new and useful Improvements in Feed-Choppers, of which the following is a specification.

The invention relates to an improvement in feed choppers particularly designed for use in chopping food for chickens.

The main object of the invention is the provision of a simple device adapted to hold and confine the food to be chopped, permitting the manual operation of the cutting medium in a convenient and expeditious manner.

The invention will be described in the following specification, reference being had particularly to the accompanying drawings, in which:—

Figure 1 is a view in elevation of my improved food chopper, Fig. 2 is a vertical section of the same, Fig. 3 a broken elevation of the chopping implement.

Referring particularly to the drawings, wherein similar reference numerals indicate like parts throughout the several views my improved chopper comprises a holder 1, which in the form illustrated comprises a solid block 2 and an open ended tubular casing 3 designed in use to fit snugly over the upper end of the block and project above the same, thereby providing a receptacle 4 of which the bottom is formed by the upper end of the block 2.

In conjunction with the holder I utilize a chopping device comprising a head 5, of approximately ax head formation to which is secured in any approved manner an extended handle 6.

In use the food to be chopped is placed within the receptacle 4 and the chopper 5 operated rapidly in an obvious manner to cut the food. As the food is confined within the wall of the casing 3 the chopping operation can be rapidly and conveniently carried on until the mass has been reduced to the desired fineness and this without any possibility of any of the food being missed by the chopper or any of the material falling outside of the casing 3.

The block 2 insures the stability of the structure and furthermore has an added important function in that the securing means, as 7, for fixing the casing 3 to the block are designed to be removably positioned to permit the lowering of the casing relative to the upper surface of the block as the block wears in use. A single holder of this character is therefore adapted for extended use as the casing may be lowered from time to time to provide the desired extent of base within the casing. The life of the holder is thus dependent solely upon the initial height of the block, it being understood that in the present invention I contemplate the use of a block initially coextensive in length with the casing.

I am aware that in meat chopping machines, large and heavy structures, in which it is not convenient, or not possible, to move the curb and yet maintain the relations of the parts, such as the knives etc., it is common to provide adjustments whereby the proper position of the working surface of the block, relatively to the knives, is maintained as the block wears away, and the wood which is selected for the purpose and which it is desirable to economize, may be used up gradually. But my invention has a somewhat different object. In a small movable chopping receptacle for kitchen use, it is practicable, as it is not in the large machines, as a rule, to adjust the curb instead of the block; and, as I make the block as long as possible, that is, as long as the curb, to utilize the block as a heavy base; so that the device is not easily upset; and the wood may be used up to the minimum. In adjusting the device the pins or nails may be pulled out, and the curb moved to a lower point, as shown in dotted lines, when the nails are driven in again. It is obvious that this adjustability of the two parts can, if desired, be utilized in packing the device in small compass for transportation.

Having thus described the invention what is claimed as new, is:—

A food chopping block comprising a solid base, a tubular casing or curb telescoping thereon, and pins for detachably securing the curb and block together at different points of adjustment; substantially as specified.

In testimony whereof, I affix my signature in presence of two witnesses.

JOHN F. RAYMOND.

Witnesses:
   A. W. BOWEN,
   W. L. WALLACE.